United States Patent [19]

Zabeck et al.

[11] Patent Number: 5,503,366

[45] Date of Patent: Apr. 2, 1996

[54] ELECTROMAGNETICALLY ACTUATED VALVE

[75] Inventors: Sebastian Zabeck, Viernheim; Andreas Sausner, Neu Isenburg, both of Germany

[73] Assignee: Firma Carl Freudenberg, Weinheim, Germany

[21] Appl. No.: 215,218

[22] Filed: Mar. 21, 1994

[30] Foreign Application Priority Data

Mar. 25, 1993 [DE] Germany ............ 43 09 739.1

[51] Int. Cl.⁶ .................................................. F16K 31/06
[52] U.S. Cl. .......................... 251/129.18; 251/129.15; 335/258
[58] Field of Search ............... 251/129.01, 129.18, 251/129.15, 129.16; 239/585.1, 585.3, 585.4; 335/248, 249, 251, 273, 279, 238, 258, 257

[56] References Cited

U.S. PATENT DOCUMENTS 4,393,994  7/1983  Rieck ............... 251/129.15 X
4,771,984  9/1988  Szablewski et al. ........... 251/129.18 X
4,917,351  4/1990  Lindbloom et al. ............... 251/129.18
5,232,167  8/1993  McCormick et al. ......... 251/129.18 X
5,246,199  9/1993  Numoto et al. ................... 251/129.15

Primary Examiner—Martin P. Schwadron
Assistant Examiner—Kevin L. Lee
Attorney, Agent, or Firm—Kenyon & Kenyon

[57] ABSTRACT

An electromagnetically actuated valve having an adjustable abutment is disclosed. The valve comprises a valve housing and at least one annularly-shaped solenoid coil, which is arranged in the valve housing and which, on its interior peripheral side, surrounds a magnet armature. The armature is capable of axially reciprocal motion with respect to the solenoid coil. The magnet armature is elastically braced in the area of its front end by a spring element that in turn transmits force against an abutment that forms a component of the valve housing. At its other end, the armature is provided with a sealing member that can be forcibly engaged against a valve seat, as needed. The abutment is adjustable relative to the valve housing along the axis of reciprocal axial motion of the magnet armature to enable adjustments to the prestressing of the spring element.

16 Claims, 3 Drawing Sheets

ELECTROMAGNETICALLY ACTUATED VALVE

BACKGROUND OF THE INVENTION

The invention relates generally to an electromagnetically actuated valve having a valve housing and at least one ring-shaped solenoid coil. This coil is arranged in the valve housing and, on its interiorly peripheral side surface, surrounds a magnet armature capable of moving back and forth in the axial direction with respect to the solenoid coil. The magnet armature is elastically braced in the area of one end by a spring element against an abutment, which forms a component of the valve housing. In the area of its other end, the armature is provided with a sealing member which can selectively be forcibly engaged with a valve seat.

An example of such a valve is disclosed in German Unexamined Patent Application 40 22 143 (the contents of which are incorporated herein by reference). One of the deficiencies of prior art approaches has been that the switching performance of the magnet armature can change with the passage of time. This may be due, for example, to manifestations of settling of the spring element and the resulting deviation of the spring characteristic. The switching performance of the valve can likewise be disadvantageously altered due to the angular deviation or misalignment of the spring element, which causes increased friction against the mounting wall.

There remains a need for the further development of this general type of valve that better provides consistent switching performance of the magnet armature over a long service life. In addition, the valve should have a simple construction entailing few parts, and should be inexpensive to manufacture.

SUMMARY OF THE INVENTION

This invention meets these needs by providing a valve having an abutment that is axially adjustable relative to the valve housing in the moving direction of the magnet armature. This feature enables one to adjust the prestressing of the spring element. The switching performance of the valve is advantageously kept within a permissible tolerance over its entire service life and, consequently, demonstrates consistently good working properties throughout its service life. Any angular deviation of the spring element, which causes increased friction between the spring and the guide at least partially surrounding the spring (resulting in wear on the wall surface and the accompanying danger of corrosion) can be compensated for by adjustment of the prestressing of the spring element. Moreover, the duty factor is consequently always of a consistent magnitude. (The duty factor of an electromagnetically actuated valve is the relationship between the cycle duration of the open valve and the total open and closed cycle duration.)

In accordance with a further advantageous feature, the abutment can comprise a holding device, which is permanently integrated in the valve housing and which has an opening leading to an axially extending passage. The holding device surrounds a relatively movable adjusting element arranged within it with respect to which it is affixed with an interference fit and/or with form locking, so that the adjusting element is arranged inside the opening of passage. In one portion of its axial extent, the holding device can be surrounded by the solenoid coil, in which case the adjusting element should be adjustable with the easiest possible motion in the axial direction, so as to achieve the most exact possible adjustment of the desired spring prestressing.

A helical compression spring can be used as the spring element. Preferably, a helical compression spring of a metallic material is used, so as to best assure a long service life over which virtually no manifestations of relaxation occur. On the side of the spring facing away from the magnet armature, the helical compression spring is guided on its exterior all along the passage opening of the holding device, at least partially along its axial extent.

In order to achieve the easiest possible motion and an exactly adjustable spring prestressing action, the holding device can have a winding or turning in the area of the passage opening—the adjusting element can be designed as a threaded member. Deviations in the switching performance lying only slightly above the permissible tolerance can be eliminated through a fine adjustment to the threaded member, given an appropriate thread pitch of the abutment. Differently constructed adjusting elements, such as bolts, which are inserted through a transition fit into the opening of passage of the holding device, are less desirable for this use, since they would not allow a fine adjustment, due to the jerky transition from static friction to sliding friction.

In the direction of the adjacent helical compression spring, the threaded member can be provided with a spigot having a diameter that is reduced relative to the screw thread, with the helical compression spring surrounding the spigot on the outside at least in the area of its ends. Besides providing guidance for the helical compression spring along a portion of the interior of the spring, this feature provides for simpler valve assembly, with the danger of the spring element being subjected to canting strain being minimized during assembly.

Another improvement in this respect is achieved by providing the spigot with a snap-fit rim that extends along the periphery and that projects in the radial direction; by providing the snap-fit rim in its circumferential area, on the side facing away from the screwhead, with a mounting chamfer; and by configuring the helical compression spring to grip the snap-fit rim from behind with at least one turn and with form locking, and to be snapped into a grooved depression delimited by the snap-fit rim. This refinement allows the threaded member and the helical compression spring to be preassembled outside of the valve, the two subassemblies that make up the preassembled unit being affixed with form-locking to one another. This unit is inserted during assembly into the passage opening of the holding device, the helical compression spring being prestressed by the threaded member to a predetermined value. The snap-fit rim, which has a barbed shape and grips the adjoining first turn of the helical compression spring from behind with form locking, also facilitates the disassembly operation. This is especially useful in the event that the sealing member, which is affixed to the magnet armature, needs to be replaced.

The threaded member can be made of a polymer material. Such construction has the advantage that the threaded member, together with its snap-fit rim that is premolded in one piece, can be produced simply and inexpensively. When a polymer material having self-lubricating properties is used, the spring prestressing can be exactly adjusted with an easy motion, even after a great deal of use. In this manner, problems of increased friction caused, for example, by contact corrosion, are effectively compensated for.

On the side facing the abutment, the magnet armature can be provided with a lining of elastomer material, the lining being formed as a spring supporting element and/or spring guide. This feature further reduces the danger that the spring element will exhibit canting strain during assembly and/or operation.

The lining can surround the helical compression spring in the area of its other end in a cone shape, on the outside, and be fastened in an appropriately formed depression of the magnet armature. It is advantageous in this case that the precise centering of the spring element in relationship to the magnet armature is assured during assembly. When choosing the material for the lining, an elastomer material should be selected that has a spring constant that exceeds the spring constant of the spring element being used by a factor of 1.5 to 20, and preferably by a factor of 10 to 15. This guarantees that the switching performance of the valve will be influenced exclusively by the elastic compliance of the spring element, so that the operational performance that is achieved can be exactly predetermined.

According to a further modification, the lining can be designed to project in an essentially conical shape in the direction of the abutment into the interior of the helical compression spring. In this embodiment as well, an exact allocation of the spring element in relation to the magnet armature is assured, the manufacture of the magnet armature being facilitated by the avoidance of inside machining.

The lining can be provided with a circular stop buffer, which is formed in one piece and is arranged in the axial direction between the magnet armature and the holding device. The stop buffers produce an end-position cushioning effect and prevent impact noises from arising in the event of extreme deflections of the relatively movable magnet armature relative to the abutment. The stop buffers serve to prevent the abutment from shifting, even in the event of sudden, impact-type contact.

In a further embodiment, the magnet armature is penetrated by a perforation extending in the direction of movement. The perforation is completely filled by the elastomeric material of the lining, the lining and the sealing member being formed so as to blend into one another in one piece. It is advantageous that the lining of elastomer material and the sealing member be premolded on one side in one tool and in one sequence of operation.

BRIEF DESCRIPTION OF THE DRAWINGS

The electromagnetically actuated valve of the invention is illustrated in the drawings and described in greater detail below, in which.

DETAILED DESCRIPTION

Figure 1:
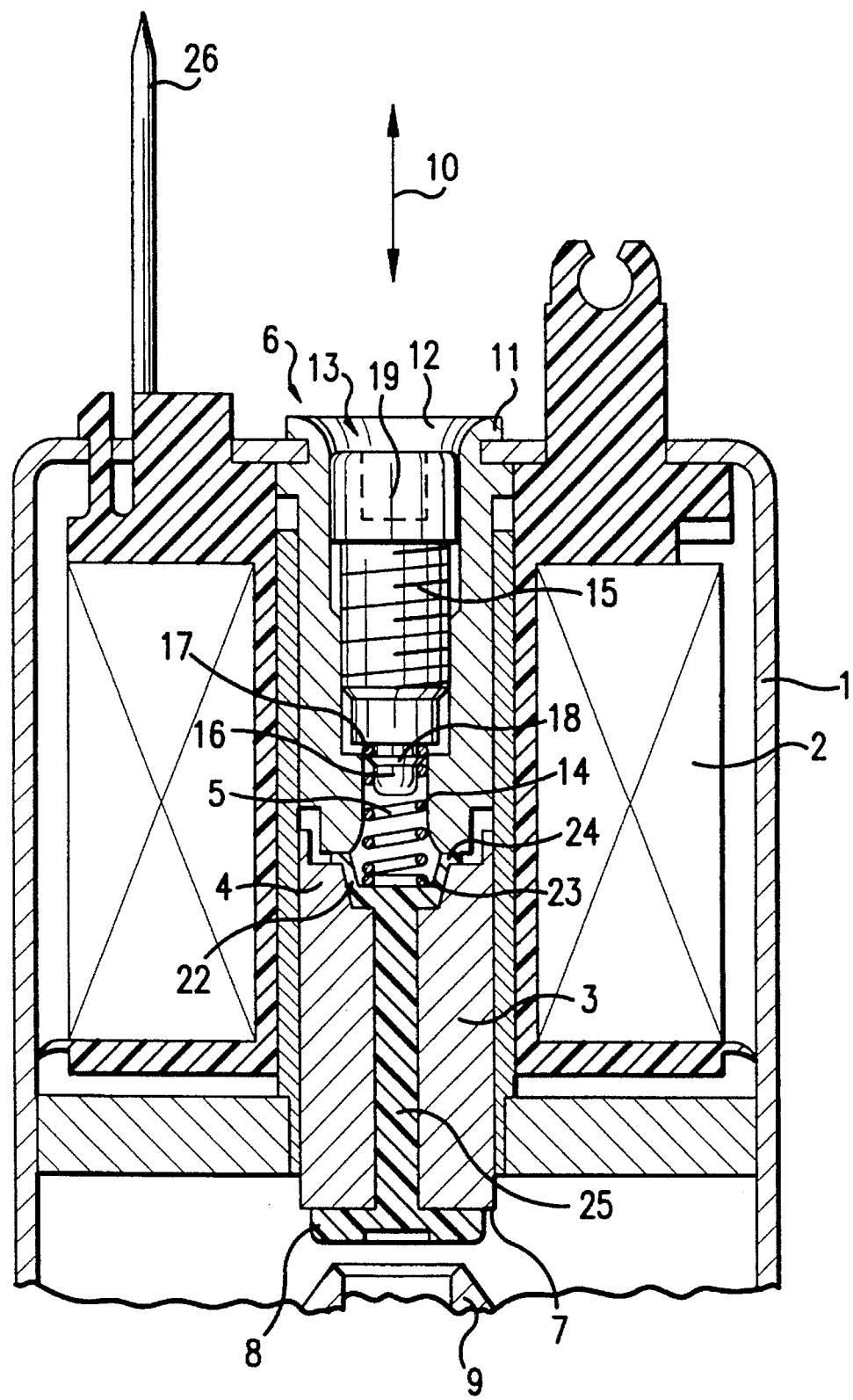
FIG. 1 is a cross-sectional view of a first embodiment of an electromagnetically actuated valve constructed according to the principles of the invention, in which the spring element is surrounded in one partial area of its axial extent by a magnet armature.
Figure 2:
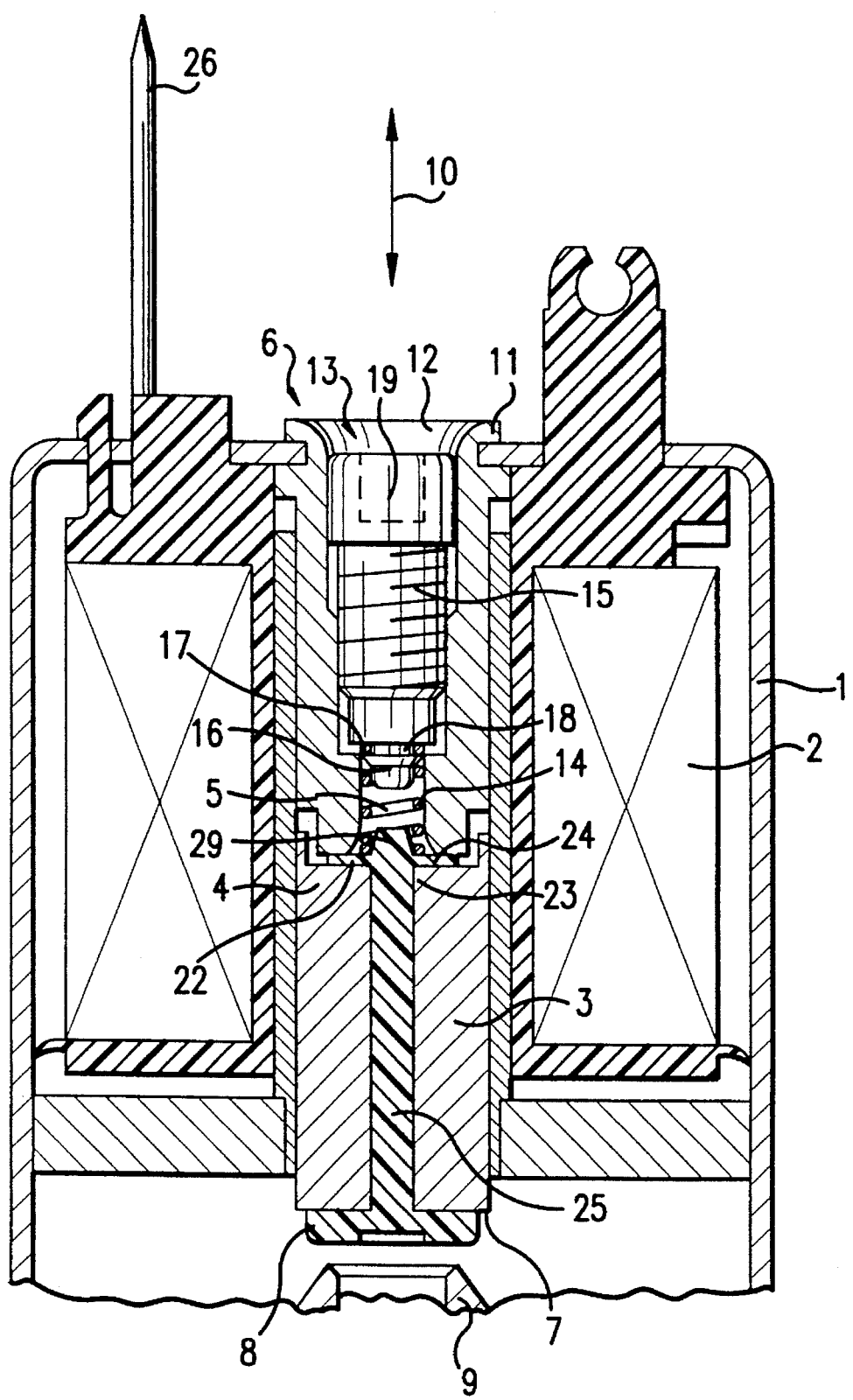
FIG. 2 is a view similar to FIG. 1, illustrating a second embodiment in which the spring element is guided on its interior through a truncated-cone-shaped projection that is connected to the magnet armature.

FIGS. 1 and 2 each show a cut-away portion of an electromagnetically actuated valve, constructed according to the principles of the invention, in which a valve is surrounded by a valve housing 1. The valve comprises an annular-shaped solenoid coil 2 having an electrical terminal 26. Arranged in the axial direction, adjacent to the solenoid coil 2, is a magnet armature 3, which is capable of linear reciprocating motion along axis 10 and, in the area of its first end face 4, is braced against a spring element 5, which in the illustrated embodiment takes the form of a helical compression spring 14 whose compressive load is transmitted against an abutment 6. On the second end face 7 of the magnet armature 3 is a sealing member 8, which can be selectively forced to engage with the valve seat 9.

In this embodiment, the abutment 6 is formed in two parts: a holding device 11, which is permanently connected to the valve housing 1; and a threaded member 15, which is designed as an adjusting element 13. In the embodiments shown here, the threaded member 15 is made of a self-lubricating polymer material, for example PTFE. Consequently, the use of a secondary lubricant for lubricating the winding or turns can be dispensed with.

The helical compression spring 14 is guided in the area of its first end 17 both inside and outside. A spigot 16 of the threaded member 15 provides inner guidance, while the opening of passage 12 of the holding device 11 provides outer guidance. The last turn of the helical compression spring 14 is penetrated with form-locking by a snap-fit rim 18, which is designed to blend in one piece together with the spigot 16 of the threaded member 15. This refinement allows the threaded member 15 and the helical compression spring 14 to be inserted together as a preassembled unit into the valve. This considerably facilitates the assembly operation.

In FIG. 1, the second end 23 of the spring 14 is retained on its exterior on the outside in a cone-shaped depression of the magnet armature 3, the depression being provided with a lining 22 of elastomeric material. In this embodiment, the magnet armature 3, the lining 22 and its sealing member 8 are designed to allow a plurality of these parts to be stacked one on another. This is quite advantageous in that it permits the simple stocking of spare parts. Stop buffers 24, which are formed to blend together in one piece together with the lining 22, are provided as cushioning means in the axial direction between the holding device 11 of the abutment 6 and the magnet armature 3. Depending upon the manufacture, the lining 22 and the sealing member 8 can be made of identical material in this embodiment. The elastomer is premolded on only one side to the magnet armature 3; it completely penetrates perforation 25 and then forms the elastomer lining 22 and the sealing member 8.

A second embodiment is shown in FIG. 2. In this embodiment, the helical compression spring 14 is guided in the area of the second end 23 on its interior via a truncated-cone-shaped projection 29, which is designed to blend in one piece together with the stop buffer 24 and the sealing member 8.

Figure 3:
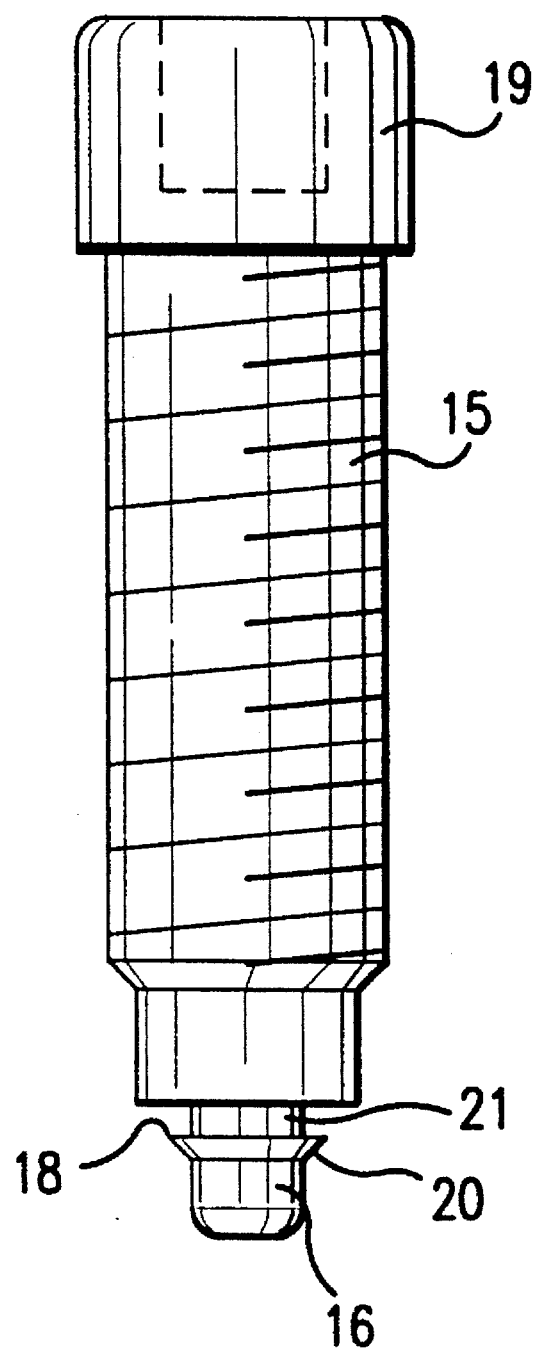
FIG. 3 shows a unitary threaded member for adjusting the level of spring prestressing.

FIG. 3 depicts the unitary threaded member 15 employed for adjusting the spring prestress. In order to provide the most compact possible type of construction, the screwhead 19 is formed with a hexagonal recess. The spigot 16 is provided with a snap-fit rim 18, which is provided on the side opposite the screwhead 19 with a mounting chamfer 20. A turn of the helical compression spring 14 employed is inserted in the grooved depression 21, which is delimited by the snap-fit rim 18. The barb-type effect of the mounting chamfer 20 allows the turn of the spring to be snapped in easily and makes it more difficult for the two parts to separate. By forming the threaded member 15 of a self-lubricating plastic, such as PTFE, one simplifies and renders more economical the manufacture of the part.

What is claimed is:

1. An electromagnetically actuated valve, comprising:

a valve housing;

a magnet armature having a first end and a second end, the second end having a sealing member;

at least one annularly-shaped solenoid coil that is arranged within the valve housing and which, along a portion of its interior side, surrounds the magnet armature, said magnet armature being capable of axially reciprocal motion with respect to the solenoid coil;

an abutment that is operatively connected to the valve housing, said abutment comprising
a holding device that is permanently integrated in the valve housing and which is provided with an opening and an axially extending bore; and
an adjusting element that is contained within the bore of the holding device and which is axially shiftable with respect to the holding device, said adjusting element terminating at an end having a spigot and a snap-fit rim;

a spring element that is braced between the adjustment element and a first end of the magnet armature, wherein the spring element cooperates with the spigot and snap-fit rim; and a valve seat, against which the sealing member of the magnet armature may selectively be brought into operative engagement;

wherein by axially adjusting the position of the adjusting element in the holding device with respect to the valve housing, the level of prestress of the spring element is adjusted.

2. The valve according to claim 1, wherein the adjusting element is secured to the holding device via an interference fit or with form locking.

3. The valve according to claim 1, wherein the spring element is a helical compression spring.

4. The valve according to claim 2, wherein the holding device has an internal thread along a portion of the axially extending bore within the holding device, and the adjusting element has a complementary external thread.

5. The valve according to claim 4, wherein the spring element is a helical compression spring, and the spigot is provided on the end of the threaded adjusting element facing the helical compression spring, said spigot having a diameter that is reduced relative to the thread on the adjusting element, and a portion of one of the ends of said helical compression spring surrounds the spigot.

6. The valve according to claim 1, wherein on the side of the magnet armature facing the abutment, the magnet armature is provided with a lining of elastomeric material, said lining serving to provide support to the spring.

7. The valve according to claim 6, wherein the lining surrounds the helical compression spring in the area of one of its ends in a conical projection, surrounding a portion of the end of the helical compression spring, and wherein the lining is securely nested in a correspondingly formed depression of the magnet armature.

8. The valve according to claim 6, wherein the lining is designed to project in a generally conical shape in the direction of the abutment and is exteriorly surrounded by a portion of one of the ends of the helical compression spring.

9. The valve according to claim 6, wherein the lining is provided with a circular stop buffer, which is formed in one piece and which is arranged in the axial direction between the magnet armature and the holding device.

10. The valve according to claim 2, wherein on the side of the magnet armature facing the abutment, the magnet armature is provided with a lining of elastomeric material, said lining serving to provide support to the spring element.

11. The valve according to claim 5, wherein on the side of the magnet armature facing the abutment, the magnet armature is provided with a lining of elastomeric material, said lining serving to provide support to the spring.

12. The valve according to claim 7, wherein the lining is provided with a circular stop buffer.

13. The valve according to claim 8, wherein the lining is provided with a circular stop buffer.

14. An electromagnetically actuated valve, comprising:

a valve housing;

a magnet armature having a first end and a second end, the second end having a sealing member;

at least one annularly-shaped solenoid coil that is arranged within the valve housing and which, along a portion of its interior side, surrounds the magnet armature, said magnet armature being capable of axially reciprocal motion with respect to the solenoid coil;

an abutment that is operatively connected to the valve housing, said abutment comprising
a holding device that is permanently integrated in the valve housing and which is provided with an opening and an axially extending threaded bore;
an externally threaded adjusting element that is contained within the bore of the holding device and which is axially shiftable with respect to the holding device, said adjusting element having a spigot in the form of a radially projecting snap-fit rim which, in the side facing away from the spring element, has a mounting chamfer, said spigot having a diameter that is less than the diameter of the thread on the adjusting element, and wherein a portion of one of the ends of said helical compression spring surrounds the spigot so as to grip the snap-fit rim from behind in a form locking manner and thereby snap the spring into a grooved depression delimited by the snap-fit rim;

a spring element that is braced between the adjustment element and a first end of the magnet armature; and a valve seat, against which the sealing member of the magnet armature may selectively be brought into operative engagement;

wherein the abutment is axially adjustable by axially adjusting the position of the adjusting element in the holding device with respect to the valve housing, to enable adjustments to the level of prestress that may be given the spring element is adjusted.

15. An electromagnetically actuated valve, comprising:

a valve housing;

a magnet armature having a first end and a second end, the second end having a sealing member;

at least one annularly-shaped solenoid coil that is arranged within the valve housing and which, along a portion of its interior side, surrounds the magnet armature, said magnet armature being capable of axially reciprocal motion with respect to the solenoid coil;

an abutment that is operatively connected to the valve housing, said abutment comprising
a holding device that is permanently integrated in the valve housing and which is provided with an opening and an axially extending threaded bore;
an externally threaded adjusting element made of polymer that is contained within the bore of the holding device and which is axially shiftable with respect to the holding device, said adjusting element having a spigot that has a diameter that is less than the diameter of the thread on the adjusting element, and wherein a portion of one of the ends of said helical compression spring surrounds the spigot;

a spring element that is braced between the adjustment element and a first end of the magnet armature; and a valve seat, against which the sealing member of the magnet armature may selectively be brought into operative engagement;

wherein the abutment is axially adjustable by axially adjusting the position of the adjusting element in the holding device with respect to the valve housing, to enable adjustments to the level of prestress that may be given the spring element is adjusted.

16. An electromagnetically actuated valve, comprising:

a valve housing;

a magnet armature having a first end and a second end, the second end having a sealing member;

at least one annularly-shaped solenoid coil that is arranged within the valve housing and which, along a portion of its interior side, surrounds the magnet armature, said magnet armature being capable of axially reciprocal motion with respect to the solenoid coil, wherein the magnet armature is penetrated by a perforation that extends in the axial direction of armature movement, said perforation being completely filled by an elastomeric lining, and the lining and the sealing member are so formed as to blend into one another in one piece;

an abutment that is operatively connected to the valve housing, said abutment comprising
    a holding device that is permanently integrated in the valve housing and which is provided with an opening and an axially extending bore; and
    an adjusting element that is contained within the bore of the holding device and which is axially shiftable with respect to the holding device;

a spring element that is braced between the adjustment element and a first end of the magnet armature; and a valve seat, against which the sealing member of the magnet armature may selectively be brought into operative engagement;

wherein by axially adjusting the position of the adjusting element in the holding device with respect to the valve housing, the level of prestress of the spring element is adjusted.

* * * * *